United States Patent
Song et al.

(10) Patent No.: US 12,517,662 B2
(45) Date of Patent: Jan. 6, 2026

(54) DATA STORAGE DEVICE AND OPERATING METHOD THEREOF

(71) Applicant: SAMSUNG ELECTRONICS CO., LTD., Suwon-si (KR)

(72) Inventors: Jinwoo Song, Suwon-si (KR); Jinmyung Yoon, Suwon-si (KR); Hee Hyun Nam, Suwon-si (KR); Gyeonghwan Yu, Suwon-si (KR); Jaehwan Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/887,913

(22) Filed: Sep. 17, 2024

(65) Prior Publication Data
US 2025/0217044 A1    Jul. 3, 2025

(30) Foreign Application Priority Data
Jan. 2, 2024   (KR) .......................... 10-2024-0000563

(51) Int. Cl.
*G06F 3/06* (2006.01)
(52) U.S. Cl.
CPC .......... *G06F 3/0619* (2013.01); *G06F 3/0656* (2013.01); *G06F 3/0659* (2013.01); *G06F 3/0679* (2013.01)
(58) Field of Classification Search
CPC .... G06F 3/0619; G06F 3/0656; G06F 3/0659; G06F 3/0679; G06F 3/0658; G06F 3/0604; G06F 3/0616; G06F 12/0292; G06F 2212/1016; G06F 2212/1036
USPC .................................................. 711/103, 102
See application file for complete search history.

(56) References Cited

U.S. PATENT DOCUMENTS

| 10,930,354 | B2 | 2/2021 | Palmer |
| 11,003,590 | B2 | 5/2021 | Song |
| 11,640,321 | B2 | 5/2023 | Jeon et al. |
| 11,726,706 | B2 | 8/2023 | Oh et al. |
| 2022/0269407 | A1* | 8/2022 | Wang .................... G06F 3/0608 |
| 2022/0300201 | A1* | 9/2022 | Vaknin .................. G06F 3/0619 |
| 2023/0135020 | A1 | 5/2023 | Byun et al. |
| 2023/0143181 | A1 | 5/2023 | Tan et al. |

FOREIGN PATENT DOCUMENTS

KR        10-2275181        7/2021

* cited by examiner

*Primary Examiner* — Hosain T Alam
*Assistant Examiner* — Zubair Ahmed
(74) *Attorney, Agent, or Firm* — Fish & Richardson P.C.

(57) ABSTRACT

A storage device includes at least one nonvolatile memory device that stores or read data, and a controller that controls the nonvolatile memory device and to perform a request received from a host. The controller programs buffer data stored in a buffer in the at least one nonvolatile memory device based on one of a plurality of striping rules associated with the at least one nonvolatile memory device. The controller changes a first striping rule to a second striping rule in response to that a given condition is satisfied and programs first buffer data in the at least one nonvolatile memory device based on the second striping rule. A write amplification factor of the first striping rule and a write amplification factor of the second striping rule are different from each other.

19 Claims, 12 Drawing Sheets

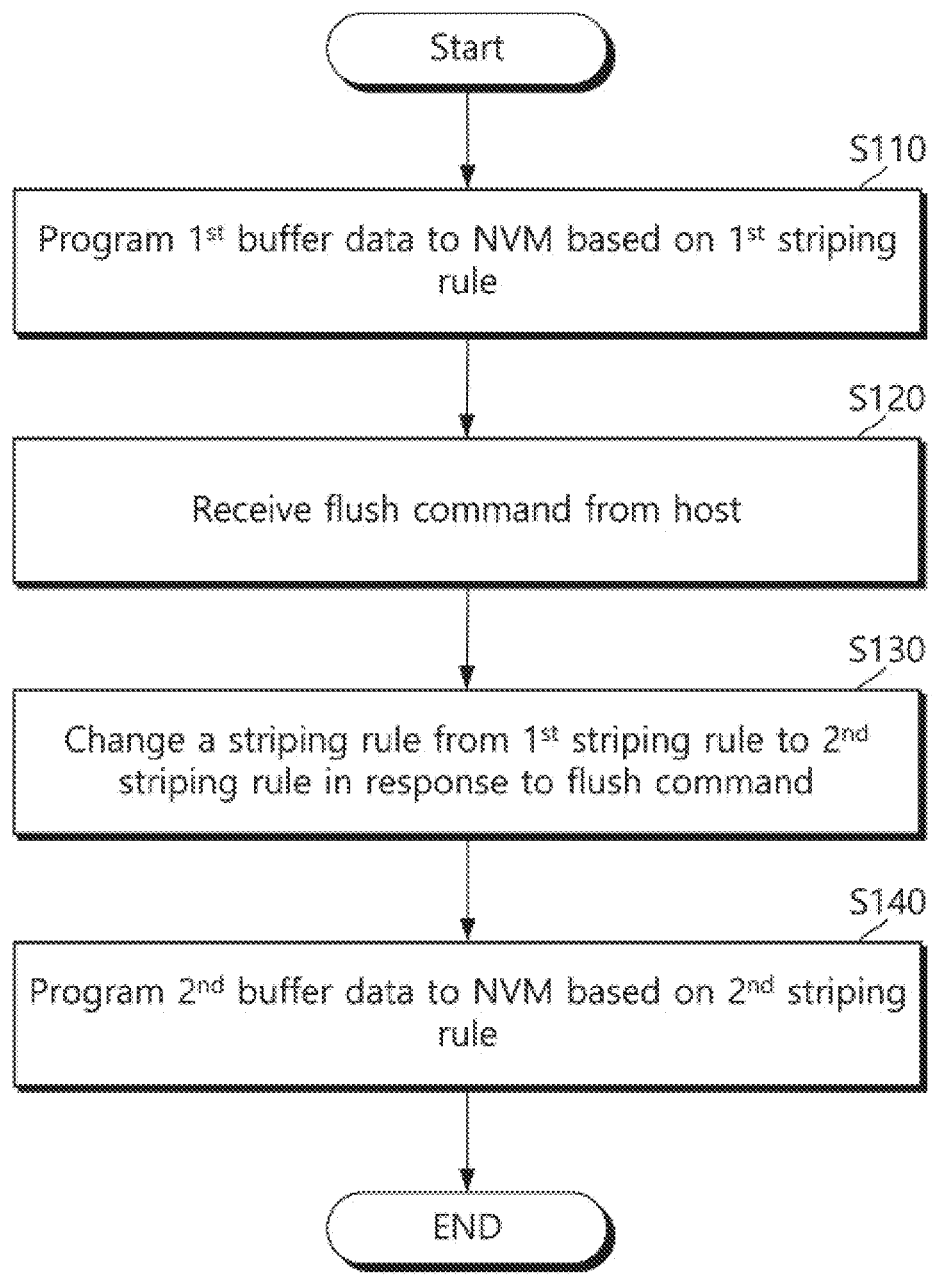

DATA STORAGE DEVICE AND OPERATING METHOD THEREOF

CROSS-REFERENCE TO RELATED APPLICATION(S)

This application claims priority under 35 U.S.C. § 119 to Korean Patent Application No. 10-2024-0000563, filed on Jan. 2, 2024, in the Korean Intellectual Property Office, the disclosure of which is incorporated by reference herein in its entirety.

BACKGROUND

An increasing amount of data is involved in artificial intelligence (AI) and autonomous driving technologies. In this case, a storage capacity of a data center is also continuously increasing, and services of the data center are also evolving. As a semiconductor device-based solid state drive (SSD) offers high input/output (I/O) performance and low energy consumption compared to a hard disk drive (HDD), the use of the solid state drive is expanding in a data center and cloud computing environment where multiple users share resources.

To improve the performance of a memory bandwidth of the SSD, interleaving data in a plurality of programming units in a round robin manner is being used. The interleaving may be used at various levels. For example, the package level interleaving, the die level interleaving, etc. are being used.

SUMMARY

Implementations of the present disclosure provide a storage device capable of reducing a write amplification factor and an operating method thereof.

Implementations of the present disclosure provide a storage device capable of reducing a write amplification factor by changing striping rules based on a command of a host and an operating method thereof.

Implementations of the present disclosure provide a storage device capable of reducing a write amplification factor by changing striping rules based on the size of buffer data, when the buffer data are programmed in a nonvolatile memory device, and an operating method thereof.

According to some implementations, a storage device may include at least one nonvolatile memory device that stores or read data, and a controller that controls the nonvolatile memory device and to perform a request received from a host. The controller may program buffer data stored in a buffer in the at least one nonvolatile memory device based on one of a plurality of striping rules associated with the at least one nonvolatile memory device. The controller may change a first striping rule to a second striping rule in response to that a given condition is satisfied and may program first buffer data in the at least one nonvolatile memory device based on the second striping rule. A write amplification factor of the first striping rule and a write amplification factor of the second striping rule may be different from each other.

According to some implementations, an operating method of a storage device may include programming, at a controller, first buffer data stored in a buffer in a nonvolatile memory device based on a first striping rule, receiving, at the controller, a flush command from a host, changing, at the controller, the first striping rule to a second striping rule in response to the flush command, and programming, at the controller, second buffer data stored in the buffer in the nonvolatile memory device based on the second striping rule.

According to some implementations, a storage device may include at least one nonvolatile memory device that stores or read data, and a controller that controls the nonvolatile memory device and to perform a request received from a host. The controller may program buffer data stored in a buffer memory in the at least one nonvolatile memory device based on one of a plurality of striping rules associated with the at least one nonvolatile memory device. In response to that a given condition is satisfied, the controller may change a first striping rule to a second striping rule and may program first buffer data in the at least one nonvolatile memory device based on the second striping rule. A write amplification factor of the first striping rule and a write amplification factor of the second striping rule may be different from each other.

According to some implementations, a storage device may include at least one nonvolatile memory device that stores or read data, and a controller that controls the nonvolatile memory device and executes a command provided from a host. The controller may program buffer data at at least one interleaving unit determined based on one of a plurality of striping rules associated with the at least one nonvolatile memory device by interleaving, the nonvolatile memory device may include a first word line and a second word line adjacent to each other, and a first interleaving unit of the first word line may be different in number from a second interleaving unit of the second word line. The first interleaving unit and the second interleaving unit may be adjacent to each other along a direction perpendicular to a word line, and the buffer data may be recorded at the first interleaving unit and the second interleaving unit based on different striping rules among the plurality of striping rules.

BRIEF DESCRIPTION OF THE FIGURES

FIG. 14 is a diagram describing an operating method of a storage device according to some implementations of the present disclosure.

DETAILED DESCRIPTION

Below, implementations of the present disclosure will be described in detail and clearly to such an extent that an ordinary one in the art easily carries out the present disclosure.

Figure 1:
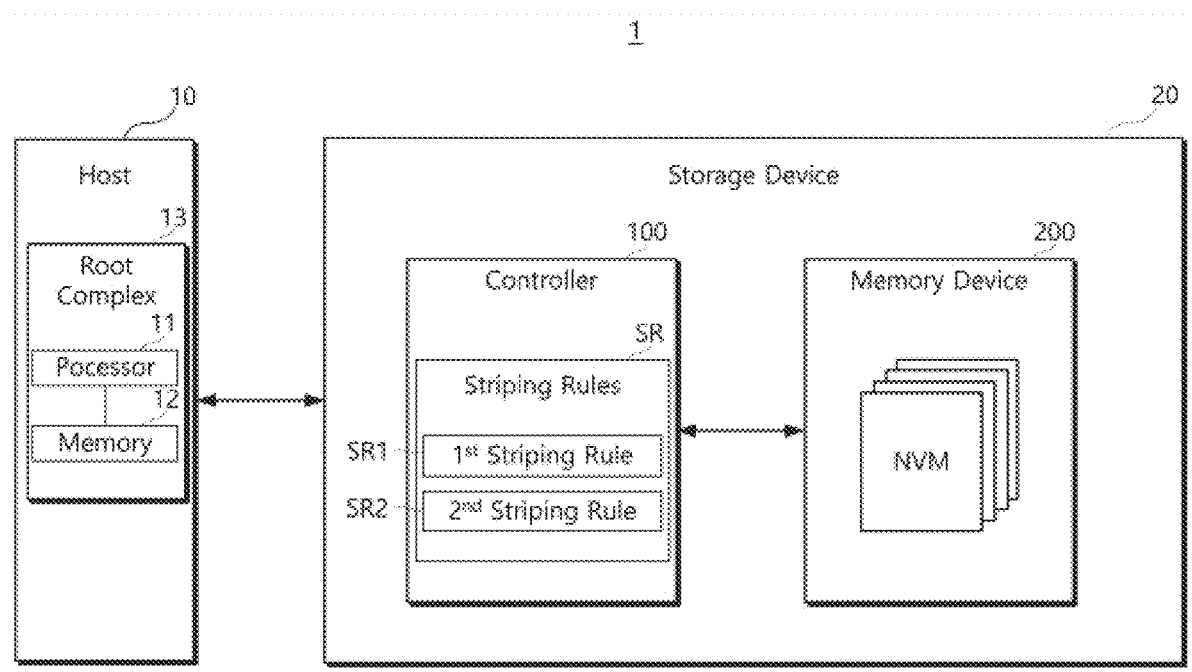
FIG. 1 is a block diagram illustrating a host-storage system according to some implementations of the present disclosure.

FIG. 1 is a block diagram illustrating a host-storage system 1 including a storage device according to some implementations of the present disclosure.

A storage device 20 according to some implementations of the present disclosure may operate based on a first striping rule among a plurality of striping rules. The storage device 20 may change a striping rule being in use to a second striping rule based on a command issued by a host 10 and/or the size of buffer data. The second striping rule may be a striping rule of reducing a write amplification factor WAF of the storage device 20. The plurality of striping rules may be different from each other in a method of interleaving data to be programmed in a nonvolatile memory device 200. For example, in a specific rule, programming may be performed in the interleaving method over the entire area of a stripe; in another specific rule, programming may be performed in the interleaving method over a partial area of a strip. That is, the number of interleaving units where programming is performed in the interleaving method may be differently determined for each of the plurality of striping rules.

In the specification, the expression "interleaved" is used as the same meanings that programming or reading is performed "by interleaving." Also, programming or a program operation is used as writing or a write operation.

Below, the description will be given in detail with reference to FIG. 1. Referring to FIG. 1, the host-storage system 1 includes the host 10 and the storage device 20. Configurations of the host 10 and the storage device 20 will be described with reference to FIG. 1. The host 10 may communicate with a plurality of storage devices. Configurations of the remaining storage devices may be the same as or similar to the configuration of the storage device 20.

The host 10 includes a processor 11 and a volatile memory device 12.

The host 10 may include a data center server, a cloud server, a personal computer, a laptop computer, etc. The host 10 may be a computing device which includes the processor 11 configured to process data.

The processor 11, the volatile memory device 12, a memory controller, a network port, a network interface, etc. may constitute a root complex 13 of the host 10.

The root complex 13 which is a sub-system of the host 10 may include a function for interconnection and/or bridge with internal components and/or peripheral devices. In the implementations to be described with reference to FIG. 1, the description will be given under the condition that the processor 11 is implemented inside the root complex 13, but the root complex 13 and the processor 11 may be independently implemented depending on implementations.

The processor 11 may be a central processing unit (CPU), an application-specific integrated circuit (ASIC), a field programmable gate array (FPGA), or any other type of processing device implemented by a software command, a micro code, and/or firmware. The processor 11 may include a plurality of processors.

The root complex 13 is connected to the volatile memory device 12. The volatile memory device 12 may include a static random access memory (SRAM) or a dynamic random access memory (DRAM). The volatile memory device 12 may be implemented with a plurality of memory modules. The volatile memory device 12 may store an instruction which is executed by the processor 11.

In some implementations, a portion of the volatile memory device 12 of the host 10 may be provided as a host memory buffer (HMB) to the storage device 20. That is, the portion of the volatile memory device 12 of the host 10 may be used as a working memory of the storage device 20.

The storage device 20 may be electrically connected to the host 10 and may be used by the host 10. The storage device 20 includes a controller 100 and at least one nonvolatile memory device 200.

The storage device 20 may be implemented in a state of being physically separated from the host 10 or may be implemented with the form factor installed in the same package as the host 10. For example, the storage device 20 may be implemented based on the E1. S, E1. L, E3. S, E3. L, or PCIe AIC (CEM) form factor. Alternatively, the storage device 20 may be implemented based on the U.2 form factor, the M.2 form factor, or any other PCIe form factor.

The storage device 20 may be coupled such that it is possible to communicate with any other components of the host 10 through a storage interface bus. According to some implementations, the storage device 20 may be directly installed in a physical port which is based on the peripheral component interconnect express (PCIe). The storage interface bus may be, for example, a PCIe bus. The host 10 may exchange data with the storage device 20 through the storage interface bus by using a storage interface protocol. The data may include user data. The storage interface protocol may be, for example, a compute express link (CXL) protocol and/or a non-volatile memory host controller express (NVMe) protocol.

The storage device 20 includes the controller 100 and the nonvolatile memory device 200.

The controller 100 may control the nonvolatile memory device 200 to perform a request received from the host 10. The request may include a request for a write operation, a read operation, and/or an erase operation of user data. The write operation may be referred to as a "record, store, and/or program operation." In the specification, the expression "the controller 100 programs data" is used as the same meaning as the controller 100 controls the nonvolatile memory device 200 to program data in the nonvolatile memory device 200.

The nonvolatile memory device 200 may include a flash memory of a two-dimensional (2D) structure or a two-dimensional (3D) structure. The flash memory may include different kinds of nonvolatile memories such as a NAND flash memory, a vertical NAND (V-NAND) flash memory, a NOR flash memory, a magnetic RAM (MRAM), a phase-change RAM (PRAM), a ferroelectric random access memory (FRAM), a spin transfer torque random access memory (STT-RAM), and/or a resistive RAM (RRAM).

The storage device 20 may selectively include a working memory (not illustrated). The working memory may include a buffer memory which temporarily stores data to be recorded at the nonvolatile memory device 200 or user data read from the nonvolatile memory device 200. According to some implementations, when the host 10 provides the host buffer memory to the storage device 20, the host buffer memory may be used as the working memory of the storage device 20.

The storage device 20 according to some implementations of the present disclosure may provide parallel processing at different levels. For example, the controller 100 may stripe I/O requests over multiple channels or may stripe I/O requests over multiple dies. In this case, the controller 100 may perform the I/O requests over multiple channels and/or multiple dies by interleaving. The storage device 20 may perform I/O requests by interleaving at various levels, such as a plane level, a block level, and a page level, depending on hardware and/or software settings, as well as the channel level and/or the die level described as an example.

The controller 100 may perform an I/O request issued by the host 10 by applying one striping rule among a plurality of striping rules SR based on a given condition.

For example, the controller 100 may temporarily store user data, which are transmitted from the host 10 together with at least one write command, in a buffer memory as buffer data. The controller 100 may program buffer data in the nonvolatile memory device 200 by applying a first striping rule SR1. The controller 100 may change the first striping rule SR1 being in use to a second striping rule SR2 in response to that a first condition set in advance is satisfied. Afterwards, the controller 100 may program buffer data in the nonvolatile memory device 200 based on the second striping rule SR2 thus changed. The first condition may be satisfied, for example, when a specific command is received from the host 10 and/or when buffer data in the buffer memory reach a given size. That the buffer data in the buffer memory reach the given size may be based on an absolute size of the buffer data or based on a ratio of the size of the buffer data to the size of the buffer memory. In other implementations, the first condition may be satisfied when an internal error situation occurs in the storage device 20. When the internal error situation occurs, the controller 100 may generate an internal flush command. The controller 100 may again change the second striping rule SR2 to the first striping rule SR1 in response to that a second condition set in advance is satisfied. For example, the second condition may be a change of a word line where buffer data are programmed.

In some implementations, write amplification factors of the plurality of striping rules SR may be different from each other. For example, the write amplification factor WAF of the second striping rule SR2 changed in response to a given condition is satisfied may be smaller than the write amplification factor WAF of the first striping rule SR1.

In the storage device 20 according to some implementations of the present disclosure, a method of interleaving data may be differently performed. For example, in the first striping rule SR1, the controller 100 may perform programming by interleaving over the entire area of a stripe where striping is performed; in the second striping rule SR2, the controller 100 may perform programming by interleaving over a partial area of a stripe where striping is performed. In this case, the controller 100 may perform programming for interleaving units, the number of which is less than the number of interleaving units of the first striping rule SR1, based on the second striping rule SR2.

That is, the storage device 20 according to some implementations of the present disclosure may reduce the write amplification factor WAF by performing programming for interleaving units, the number of which is less than the number of interleaving units of the first striping rule SR1, based on the second striping rule SR2. Accordingly, a ratio at which the nonvolatile memory device 200 occupies temporary data associated with an I/O may decrease, and the lifetime of the nonvolatile memory device 200 may increase.

Figure 2:
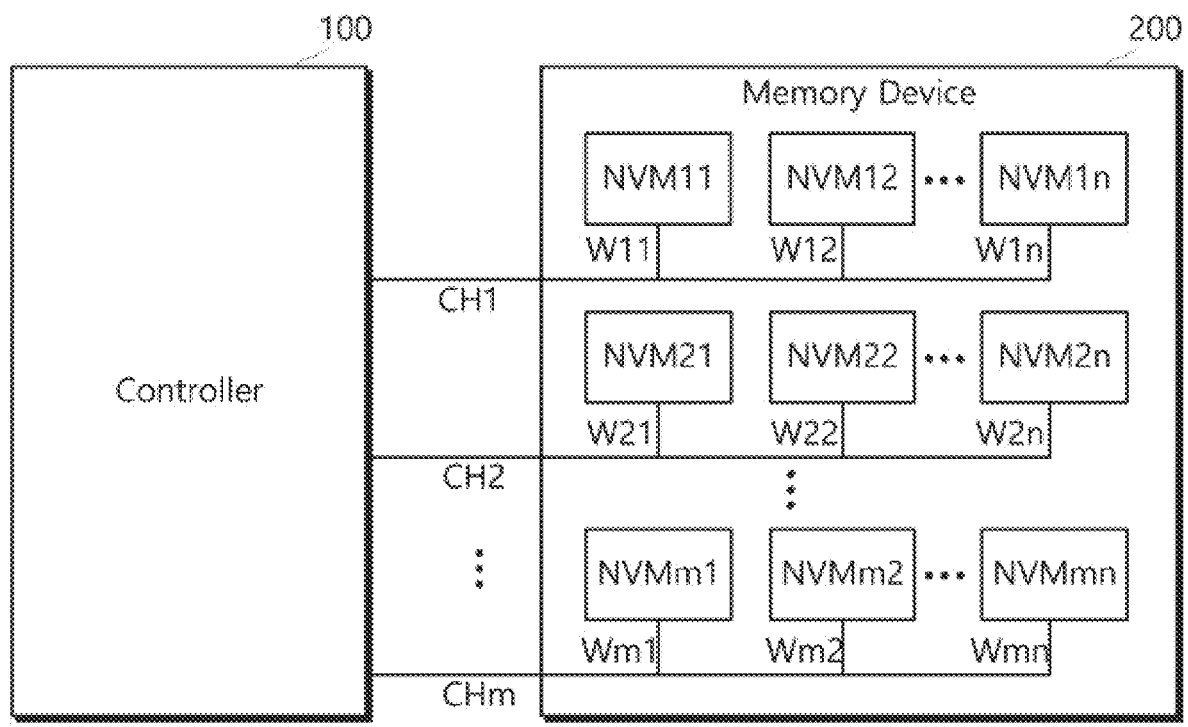
FIG. 2 is a block diagram illustrating a storage device according to some implementations of the present disclosure.

FIG. 2 is a block diagram illustrating a storage device according to some implementations of the present disclosure. The storage device 20 of FIG. 2 may correspond to the storage device 20 of FIG. 1.

The controller 100 may perform an I/O associated with a plurality of nonvolatile memory devices NVM11 to NVMmn through a plurality of channels CH1 to CHm. The nonvolatile memory device 200 and the controller 100 may be connected through the plurality of channels CH1 to CHm. In some implementations, the controller 100 may include a plurality of controller modules for each channel.

The controller 100 may control the nonvolatile memory devices NVM11 to NVMmn connected to one of the plurality of channels CH1 to CHm through ways.

The controller 100 may exchange signals with the nonvolatile memory device 200 through the plurality of channels CH1 to CHm. For example, the controller 100 may transmit commands, addresses, and/or data to the nonvolatile memory device 200 through the channels CH1 to CHm or may receive data from the nonvolatile memory device 200 through the channels CH1 to CHm.

The nonvolatile memory device 200 includes the plurality of nonvolatile memory devices NVM11 to NVMmn. Each of the nonvolatile memory devices NVM11 to NVMmn may be a nonvolatile memory package. In some implementations, each of the nonvolatile memory devices NVM11 to NVMmn may include a plurality of dies, but the present disclosure is not limited thereto.

The controller 100 may simultaneously drive at least some of the plurality of channels CH1 to CHm such that parallel processing for an I/O is provided. For example, the controller 100 may stripe an I/O over the multiple channels CH1 to CHm. Also, the controller 100 may stripe an I/O over multiple dies disposed in each of the nonvolatile memory devices NVM11 to NVMmn. Alternatively, the controller 100 may perform different I/Os associated with different nonvolatile memory devices NVM11 to NVMmn over the multiple channels CH1 to CHm. For example, the controller 100 may transmit different commands to the nonvolatile memory device 200 through the first channel CH1 and the second channel CH2.

The storage device 20 according to some implementations of the present disclosure may change a striping rule for the plurality of nonvolatile memory devices NVM11 to NVMmn or may change a striping rule for dies included in each of the plurality of nonvolatile memory devices NVM11 to NVMmn. Alternatively, the storage device 20 may change a striping rule for planes included in each of the dies. That is, some implementations of the present disclosure may include changing a striping rule at various levels supporting interleaving depending on settings of hardware and/or software, not changing a striping rule at a specific level.

Figure 3:
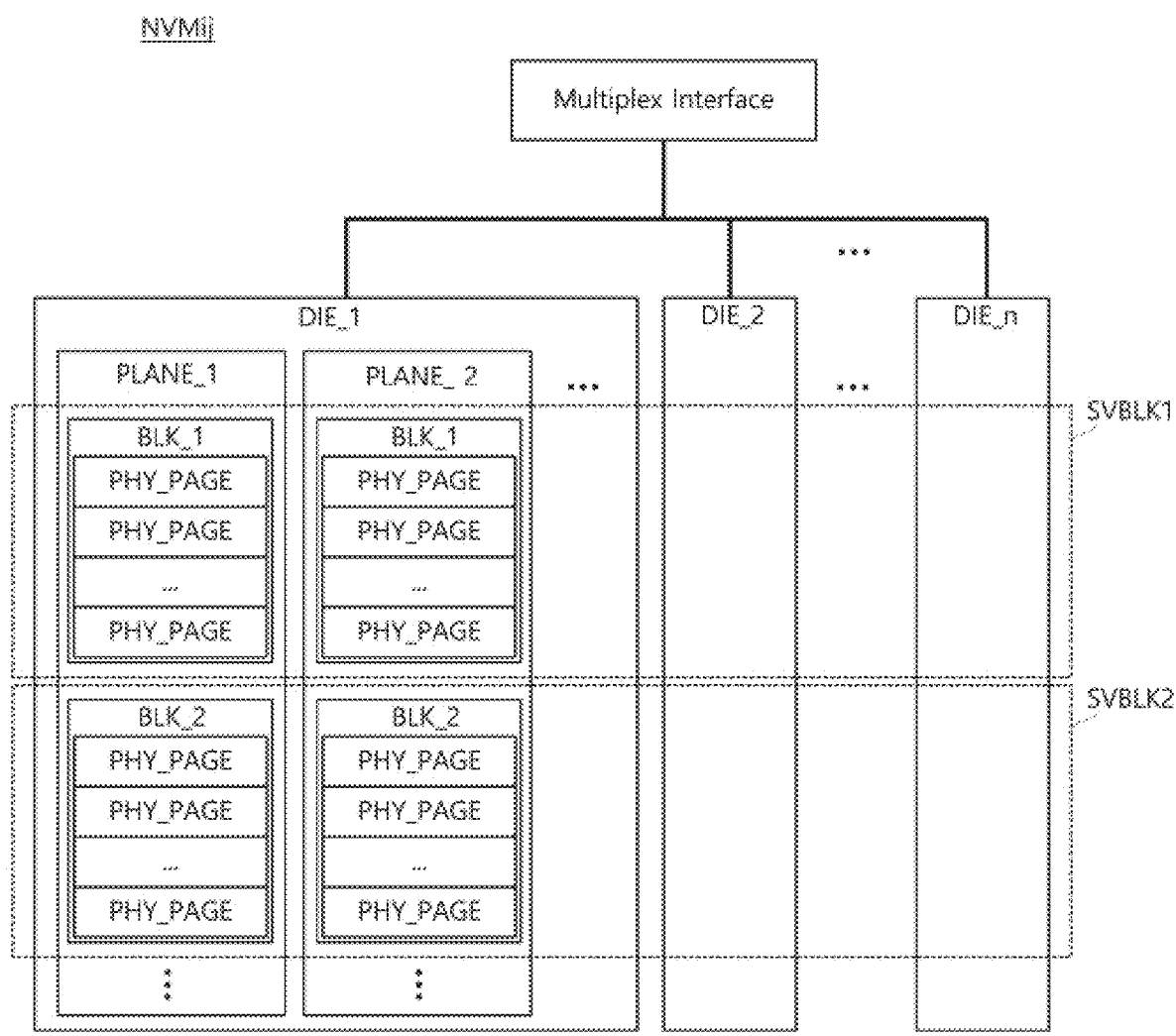
FIG. 3 is a diagram describing a nonvolatile memory device according to some implementations of the present disclosure.

FIG. 3 is a block diagram illustrating any one nonvolatile memory device of a storage device according to some implementations of the present disclosure. A nonvolatile memory device NVMij of FIG. 3 may correspond to one of the nonvolatile memory devices NVM11 to NVMmn of FIG. 2.

The nonvolatile memory device NVMij includes a plurality of dies DIE_1 to DIE_n, and each of the plurality of dies DIE_1 to DIE_n may include a plurality of planes. Each plane includes a plurality of memory blocks BLK_1, BLK_2, etc. The plurality of memory blocks BLK_1, BLK_2, etc. included in the plurality of dies DIE_1 to DIE_n may be grouped into super blocks SVBLK. For example, the plurality of memory blocks BLK_1 respectively included in the plurality of dies DIE_1 to DIE_n may be grouped as a first super block SVBLK1, and the plurality of memory blocks BLK_2 respectively included in the plurality of dies DIE_1 to DIE_n may be grouped as a second super block SVBLK2. According to some implementations, the memory block BLK may mean a physical block. The super block SVBLK may refer to a unit of a logical memory area, by which the controller 100 manages the nonvolatile memory device 200. The memory block BLK includes a plurality of physical pages PHY_PAGE. The physical page PHY_PAGE may include memory cells connected to the same word line. A memory cell may include a single level cell (SLC), a multi-level cell (MLC), a triple level cell (TLC), a quadruple level cell (QLC), etc.

The striping rule according to some implementations of the present disclosure may mean that an I/O is performed in the super block SVBLK by interleaving. For example, according to a first striping rule, in the plurality of dies DIE_1 to DIE_n constituting the super block SVBLK, interleaving may be performed for each die. According to a second striping rule, in some dies among the plurality of dies DIE_1 to DIE_n constituting the super block SVBLK, interleaving may be performed for each die. That is, according to the first striping rule, data may be programmed in each of the plurality of dies DIE_1 to DIE_n in the round robin manner. According to the second striping rule, data may be programmed in each of some of the plurality of dies DIE_1 to DIE_n in the round robin manner. A method of determining the number of dies to which the second striping rule is to be applied will be described in detail with reference to FIGS. 8 to 12.

Figure 4:
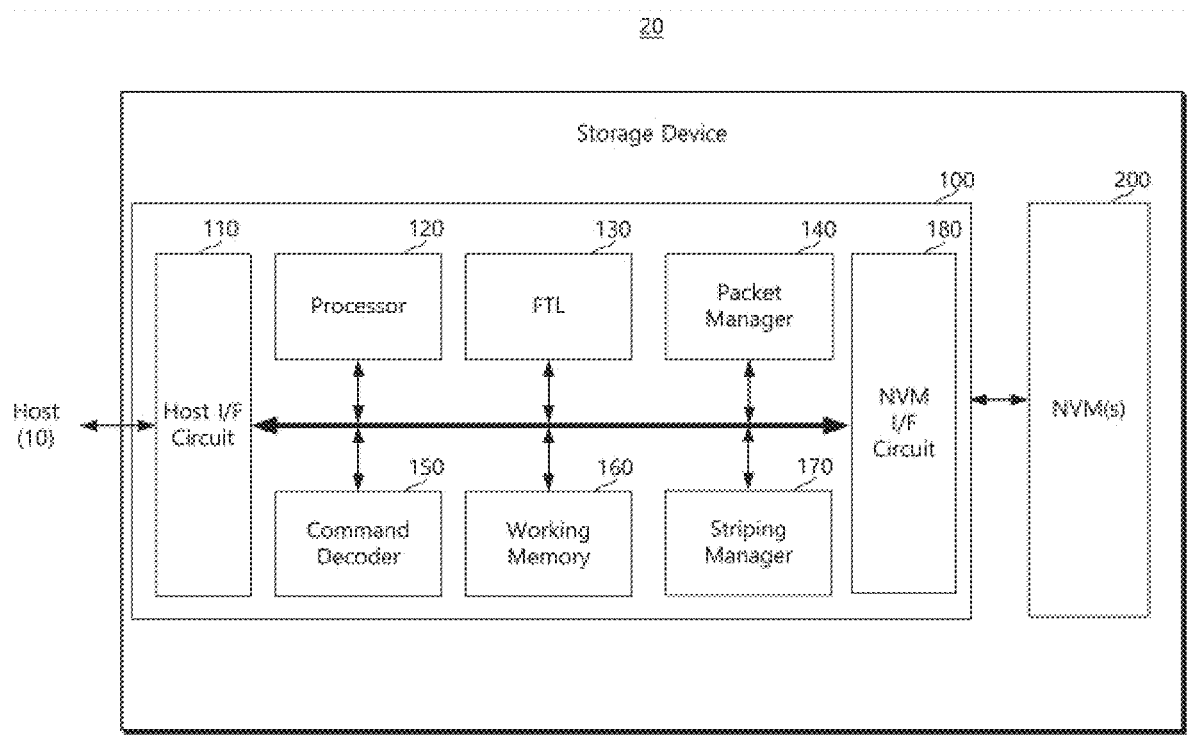
FIG. 4 is a block diagram illustrating a configuration of a storage device according to some implementations of the present disclosure.

FIG. 4 is a block diagram illustrating a configuration of a storage device according to some implementations of the present disclosure. In FIG. 4, the storage device 20 according to some implementations of the present disclosure may correspond to the storage device 20 of FIGS. 1 and 2.

In FIG. 4, the storage device 20 according to some implementations of the present disclosure includes the controller 100 and at least one nonvolatile memory device 200.

The controller 100 includes a host interface circuit 110, a processor 120, a flash translation layer (FTL) 130, a packet manager 140, a command decoder 150, a working memory device 160, a striping manager 170, and a nonvolatile memory interface circuit 180.

The controller 100 may communicate with the host 10 through the host interface circuit 110. The host interface circuit 110 may be implemented with various interfaces such as an advanced technology attachment (ATA) interface, a serial ATA (SATA) interface, an external SATA (e-SATA) interface, a small computer small interface (SCSI), a serial attached SCSI (SAS), a peripheral component interconnection (PCI) interface, a PCI express (PCIe) interface, an IEEE 1394 interface, a universal serial bus (USB) interface, and a non-volatile memory host controller express (NVMe) interface.

The processor 120 may load firmware of the storage device 20 to the working memory device 160 and may perform an overall operation of the controller 100. The processor 120 may load the flash translation layer 130 to the working memory device 160; based on an address translation result of the flash translation layer 130, the processor 120 may program data in the nonvolatile memory device 200 and/or may read data from the nonvolatile memory device 200.

The flash translation layer 130 may perform various operations such as an address mapping operation, a wear-leveling operation, and a garbage collection operation.

The address mapping operation refers to an operation of translating a logical address received from the host 10 into a physical address to be used to actually program data in the nonvolatile memory device 200. For example, a logical block address (LBA) of user data which are requested by the host 10 to be programmed may be translated into a physical address of the nonvolatile memory device 200 by using the flash translation layer 130. In some implementations, the physical address may be a physical page number (PPN). In some implementations, an address mapping table which the flash translation layer 130 manages may store a mapping relationship of a logical page number (LPN) and a physical page number. Each of logical page numbers may correspond to logical block addresses (LBA).

The wear-leveling which is a technology for allowing blocks of the nonvolatile memory device 200 to be used uniformly such that excessive deterioration of a specific block is prevented may be implemented, for example, through a firmware technology for balancing erase counts of physical blocks. The garbage collection refers to a technology for securing an available capacity of the nonvolatile memory device 200 through a way to copy valid data of a block to a new block and to then erase the block.

The packet manager 140 may generate a packet complying with an interface protocol negotiated with the host 10 or may parse various kinds of information from the packet received from the host 10.

The command decoder 150 may decode the command parsed from the packet based on a protocol of an interface negotiated with the host 10. For example, the processor 120 may decode an opcode of a command which is based on the NVMe protocol and may distinguish a write command, a read command, and/or a flush command. The processor 120 may perform a request issued by the host 10 depending on the decoded commands.

The working memory device 160 may include registers for storing variables of the controller 100. In some implementations, the working memory device 160 which operates as a buffer memory may temporarily store data to be recorded at the nonvolatile memory device 200 or data read from the nonvolatile memory device 200. The working memory device 160 may be implemented with a volatile memory device. FIG. 4 shows an example where the working memory device 160 is located inside the controller 100, but the working memory device 160 may be disposed inside and/or outside the controller 100 depending on some implementations. Alternatively, when the host buffer memory is provided by the host 10, the working memory device 160 may not operate as a buffer memory.

The striping manager 170 according to some implementations of the present disclosure may control a plurality of striping rules. The striping manager 170 may perform an I/O by applying one of the plurality of striping rules based on a given condition.

In some implementations, when a given command is received from the host 10, the striping manager 170 may change a striping rule and may perform an I/O. For example, the given command may be the flush command. In this case, when the command decoder 150 may parse a packet provided from the host 10; when the parsed opcode is the flush command, the processor 120 may request the striping manager 170 to change a striping rule. The striping manager 170 may change a striping rule being in use to a striping rule corresponding to the flush command. The processor 120 may program buffer data in the nonvolatile memory device 200 by interleaving, based on the changed striping rule. The number of interleaving units to be interleaved may be determined based on the changed striping rule.

In other implementations, when a given command of a buffer memory is received, the striping manager 170 may change a striping rule based on the size of buffer data and may perform an I/O. For example, when a command provided from the host 10 is the flush command, the processor 120 may request the striping manager 170 to change a striping rule. When a ratio of the size of buffer data to the size of the buffer memory satisfies a given condition or when an absolute size of buffer data satisfies a given condition, the striping manager 170 may change a striping rule being in use to a striping rule corresponding to the flush command. The processor 120 may program buffer data in the nonvolatile memory device 200 by interleaving, based on the changed striping rule. The number of interleaving units to be interleaved may be determined based on the changed striping rule. When the ratio of the size of buffer data to the size of the buffer memory or the absolute size of buffer data does not satisfy the given condition, the striping manager 170 may not change the striping rule being in use.

In other implementations, the striping manager 170 may change a striping rule based on the status of the storage device 20 and may perform an I/O. For example, in response to that an internal error situation or the like occurs in the storage device 20, the striping manager 170 may change a striping rule being in use to a striping rule corresponding to the error situation or the like. The striping rule corresponding to the error situation or the like may be a striping rule in which an internally generated flush command is processed.

Figure 5:
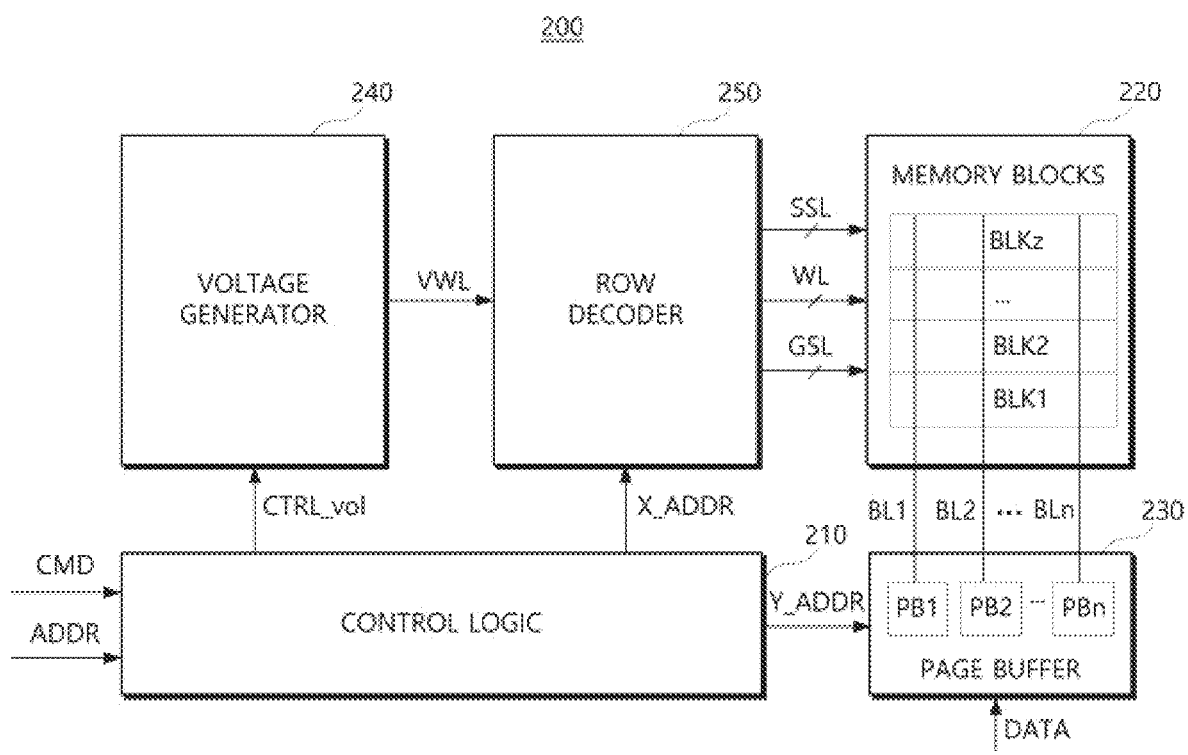
FIG. 5 is a diagram illustrating a configuration of a memory device of a storage device according to some implementations of the present disclosure.

FIG. 5 is a diagram illustrating a configuration of a nonvolatile memory device of a storage device according to some implementations of the present disclosure. In FIG. 5, the nonvolatile memory device 200 according to some implementations of the present disclosure may correspond to the nonvolatile memory device 200 of FIGS. 1, 2, and 4.

Referring to FIG. 5, the nonvolatile memory device 200 includes a control logic circuit 210, memory blocks 220, a page buffer 230, a voltage generator 240, and a row decoder 250. Although not illustrated in FIG. 5, the nonvolatile memory device 200 may further include components of a memory device of a well-known solid state drive, such as a memory interface circuit, column logic, a pre-decoder, a temperature sensor, a command decoder, and an address decoder.

The control logic circuit 210 may overall control various kinds of operations of the nonvolatile memory device 200. The control logic circuit 210 may output various kinds of control signals in response to a command CMD and/or a physical address ADDR from the memory interface circuit. For example, the control signals includes a voltage control signal CTRL_vol, a row address X_ADDR, and a column address Y_ADDR.

The memory blocks 220 includes a plurality of memory blocks BLK1 to BLKz (z being a positive integer), and each of the plurality of memory blocks BLK1 to BLKz may include a plurality of memory cells. The memory blocks 220 may be connected to the page buffer 230 through bit lines BL1 to BLn and may be connected to the row decoder 250 through word lines WL, string selection lines SSL, and ground selection lines GSL.

The page buffer 230 includes a plurality of page buffers PB1 to PBn (n being an integer of 3 or more), and the plurality of page buffers PB1 to PBn may be respectively connected to memory cells included in each of the plurality of memory blocks BLK1 to BLKz through the plurality of bit lines BL1 to BLn. The page buffer 230 may select at least one of the bit lines BL1 to BLn in response to the column address Y_ADDR. The page buffer 230 may operate as a write driver or a sense amplifier depending on an operation mode. For example, in the program operation, the page buffer 230 may apply a bit line voltage corresponding to data to be programmed to the selected bit line. In the read operation, the page buffer 230 may sense a current or a voltage of the selected bit line to read data stored in a memory cell.

The voltage generator 240 may generate various kinds of voltages for performing the program, read, and erase operations based on the voltage control signal CTRL_vol.

In response to the row address X_ADDR, the row decoder 250 may select one of the plurality of word lines WL and may select one of the plurality of string selection lines SSL.

The nonvolatile memory device 200 according to some implementations of the present disclosure may selectively activate some of the bit lines BL1 to BLn, based on each of a plurality of striping rules. For example, according to the changed striping rule, data may be only programmed in some of memory cells connected to the selected word line. Accordingly, in this case, the control logic circuit 210 may provide the page buffer 230 with the column address Y_ADDR corresponding to the changed striping rule. In some implementations, data "DATA" which are provided to the page buffer 230 depending on the changed striping rule may be buffer data corresponding to the flush command of the host 10.

Figure 6:
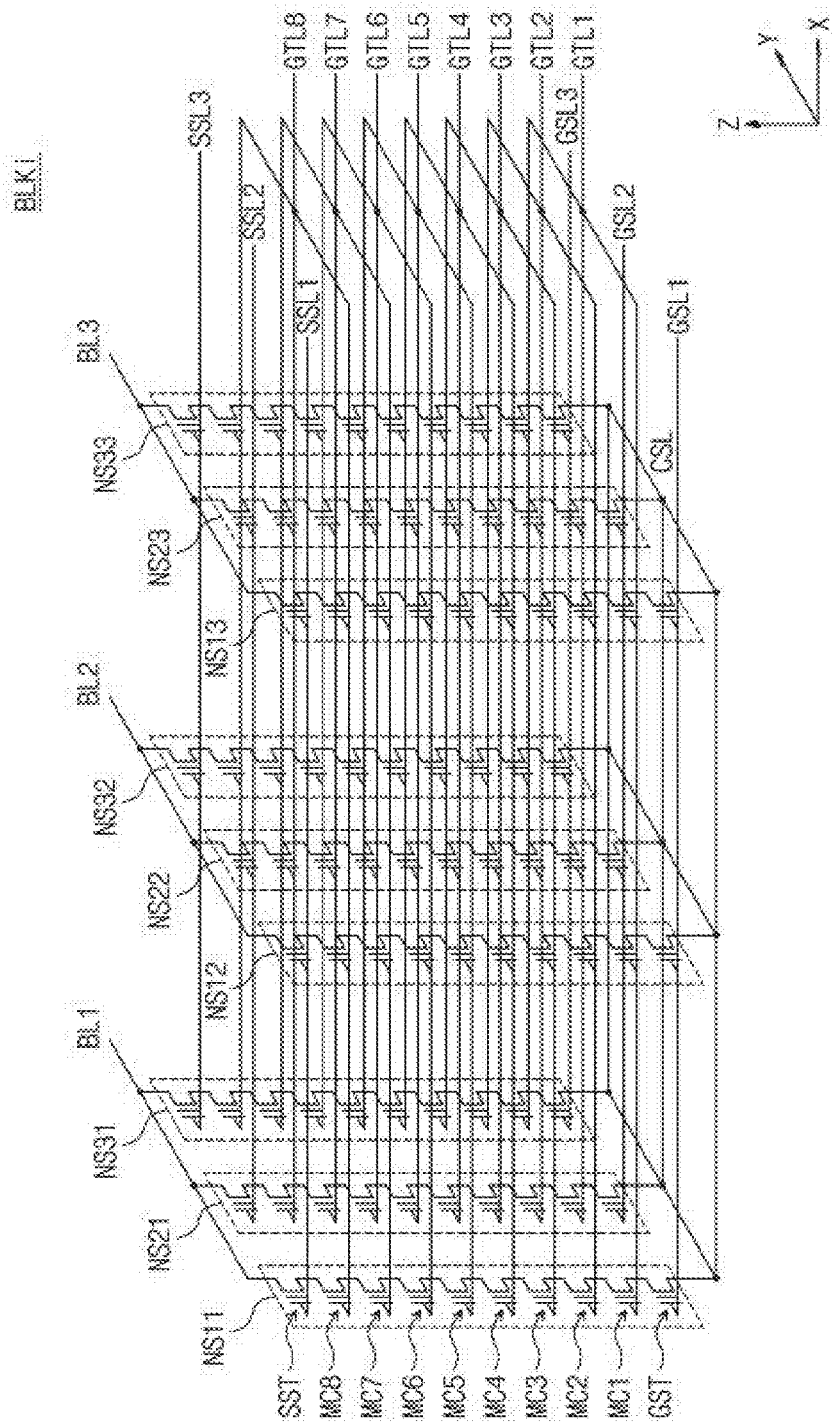
FIG. 6 is a diagram illustrating memory blocks of a storage device according to some implementations of the present disclosure.

FIG. 6 is a diagram illustrating a memory block of a three-dimensional V-NAND structure applicable to a storage device according to some implementations of the present disclosure. In FIG. 6, a memory block BLKi may correspond to one of the memory blocks BLK_1, BLK_2, etc. of FIG. 3. When a nonvolatile memory of a storage device is implemented with a 3D V-NAND-type flash memory, each of a plurality of memory blocks constituting the nonvolatile memory may be expressed by an equivalent circuit illustrated in FIG. 6.

The memory block BLKi illustrated in FIG. 6 indicates a three-dimensional memory block formed on a substrate in a three-dimensional structure. For example, a plurality of memory NAND strings included in the memory block BLKi may be formed in a direction perpendicular to the substrate.

Referring to FIG. 6, the memory block BLKi includes a plurality of memory NAND strings NS11 to NS33 connected between the bit line BL1 to BL3 and a common source line CSL. Each of the plurality of memory NAND strings NS11 to NS33 includes a string selection transistor SST, a plurality of memory cells MC1, MC2, . . . , MC8, and a ground selection transistor GST. Some implementations in which each of the plurality of memory NAND strings NS11 to NS33 includes 8 memory cells MC1, MC2, . . . , MC8 are illustrated in FIG. 6, but implementations of the present disclosure is not limited thereto.

The string selection transistor SST may be connected to a corresponding one of string selection lines SSL1, SSL2, and SSL3. The plurality of memory cells MC1, MC2, ..., MC8 may be respectively connected to gate lines GTL1, GTL2, ..., GTL8. The gate lines GTL1, GTL2, ..., GTL8 may correspond to word lines, and at least one of the gate lines GTL1, GTL2, ..., GTL8 may correspond to a dummy word line. The ground selection transistor GST may be connected to a corresponding one of ground selection lines GSL1, GSL2, and GSL3. The string selection transistor SST is connected to a corresponding bit line among the bit lines BL1, BL2, and BL3, and the ground selection transistor GST is connected to the common source line CSL.

Word lines (e.g., WL1) at the same height may be connected in common, and the ground selection lines GSL1, GSL2, and GSL3 and the string selection lines SSL1, SSL2, and SSL3 may be separated from each other. Some implementations in which the memory block BLKi is connected to 8 gate lines GTL1, GTL2, ..., GTL8 and 3 bit lines BL1, BL2, and BL3 is illustrated in FIG. 6, but implementations of the present disclosure is not limited thereto.

The bit density of the memory block BLKi may vary depending on the number of bits which each of the memory cells included in the memory block BLKi stores.

Figure 7:
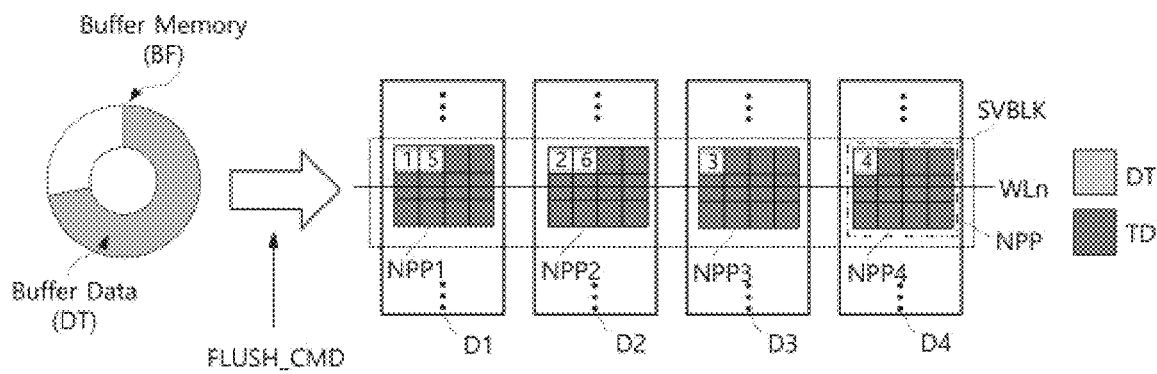
FIG. 7 is a diagram illustrating how to process a flush command based on a striping rule of a related art.

FIG. 7 is a diagram illustrating how to process a flush command based on a striping rule of a related art.

When a host requests a conventional storage device to store user data, the conventional storage device temporarily stores the user data transmitted from the host in a buffer memory BF. When the user data are stored in the buffer memory BF, the storage device allocates a physical address to the user data. For example, the storage device may allocate a physical page number (PPN) to the stored user data of the buffer memory BF. That is, as will be described below, because the conventional storage device is fixed as programming buffer data DT in all the NAND program pages NPP constituting the super block SVBLK by interleaving, the conventional storage device may allocate a physical address to the buffer data DT.

When the size of the buffer data DT stored in the buffer memory BF (or a ratio of the size of the buffer data DT to the size of the buffer memory BF) satisfies a given condition, the storage device programs the user data in a nonvolatile memory device. For example, when the buffer memory BF is fully filled by the buffer data DT, the storage device programs the user data in the nonvolatile memory device. When the storage device supports interleaving, the storage device programs the user data in the nonvolatile memory device by interleaving.

FIG. 7 shows a method in which the conventional storage device programs the buffer data DT temporarily stored in the buffer memory BF in the nonvolatile memory device by interleaving, in response to the flush command received from the host.

The description will be given under the assumption that the storage device of FIG. 7 includes 4 dies D1 to D4 and each of the dies D1 to D4 includes one plane. The storage device will be described under the assumption that blocks of the 4 dies D1 to D4, which are connected to the same word line WLn, are grouped as the super block SVBLK and the block of each of the dies D1 to D4 constitutes one NAND program page NPP. The NAND program page NPP may mean a unit by which the storage device programs data in the nonvolatile memory device. For example, when the memory cell of the nonvolatile memory device is an SLC, the NAND program page NPP may correspond to buffer data corresponding to 4 logical page numbers LPN. When the memory cell of the nonvolatile memory device is a TLC, the NAND program page NPP may correspond to buffer data corresponding to 12 logical page numbers LPN. FIG. 7 shows an example in which the blocks of the dies D1 to D4 include NAND program pages NPP1 to NPP4, respectively, and each of the NAND program pages NPP1 to NPP4 has buffer data corresponding to 12 logical page numbers LPN. Each of square boxes of the NAND program pages NPP1 to NPP4 of FIG. 7 corresponds to one logical page number LPN, and a label of each of the square boxes means an order in which data are input to the buffer memory BF. Accordingly, a square box labeled by index 1 may mean user data which are first input to the buffer memory BF and correspond one logical page number LPN and may be referred to as "LPN 1." Below, implementations of the present disclosure illustrated in FIGS. 8 to 13 will be described under the same assumption.

Referring to FIG. 7, the conventional storage device may receive the flush command from the host in a state where the buffer data DT corresponding to 6 logical page numbers LPN are temporarily stored in the buffer memory BF. That is, because the buffer memory BF is not fully filled by the buffer data DT, the conventional storage device may receive the flush command from the host in a state where a condition for programming data in the nonvolatile memory device is not satisfied. In this case, the storage device programs the buffer data DT corresponding to the 6 logical page numbers LPN in the 4 dies D1 to D4 of the nonvolatile memory device by interleaving. Accordingly, in the round robin manner, the storage device programs buffer data LPN 1 at a NAND program page NPP1 of the first die D1, programs buffer data LPN 2 at a NAND program page NPP2 of the second die D2, programs buffer data LPN 3 at a NAND program page NPP3 of the third die D3, programs buffer data LPN 4 at a NAND program page NPP4 of the fourth die D4, again programs buffer data LPN 5 at the NAND program page NPP1 of the first die D1, and again programs buffer data LPN 6 at the NAND program page NPP2 of the second die D2. That is, the storage device programs the buffer data DT at all the NAND program pages NPP1 to NPP4 constituting the super block SVBLK by interleaving.

Memory cells included in the NAND program page NPP, which is a program unit of the nonvolatile memory device, are simultaneously programmed. Accordingly, in FIG. 7, because one or more of the buffer data LPN1 to LPN6 are programmed at each of the NAND program pages NPP1 to NPP4, the storage device programs the buffer data LPN1 to LPN6 at the NAND program pages NPP1 to NPP4 together with temporary data TD. That is, the temporary data TD are programmed in at least a portion of each of the NAND program pages NPP1 to NPP4. In some implementations, the temporary data may be dummy data with a given pattern. Alternatively, the temporary data may be data with a pattern which is the same as a portion of user data and is repeated. In the specification, the temporary data include all data, which are additionally stored at the NAND program page NPP together with user data by the storage device, as well as user data requested by the host to be stored, without specifically limiting a method of configuring data.

Referring to FIG. 7, the buffer data DT stored in each of the NAND program pages NPP1 to NPP4 correspond to 6 logical page numbers LPN, but the temporary data TD correspond to a total of 42 logical page numbers LPN. Accordingly, the write amplification factor WAF of the storage device described with reference to FIG. 7 is 8 (=48/6), which is a ratio of the size of data requested by the host to be stored to the size of data actually programmed in the nonvolatile memory device. That is, when the conventional storage device processes the buffer data DT in response to the flush command of the host in a state where the buffer memory BF is not fully filled by the buffer data DT, the write amplification factor WAF may become greater. As in the above description, even when the conventional storage device processes the buffer data DT in response to the flush command internally generated by the storage device in a state where the buffer memory BF is not fully filled by the buffer data DT, the write amplification factor WAF may become greater. That is, even when the conventional storage device programs the buffer data DT in the nonvolatile memory device in a state where the buffer memory BF is not fully filled by the buffer data DT, a striping rule in which the buffer data DT are programmed in a state where the buffer memory BF is fully filled by the buffer data DT may be used; in this case, the write amplification factor WAF may become greater.

Figure 8:
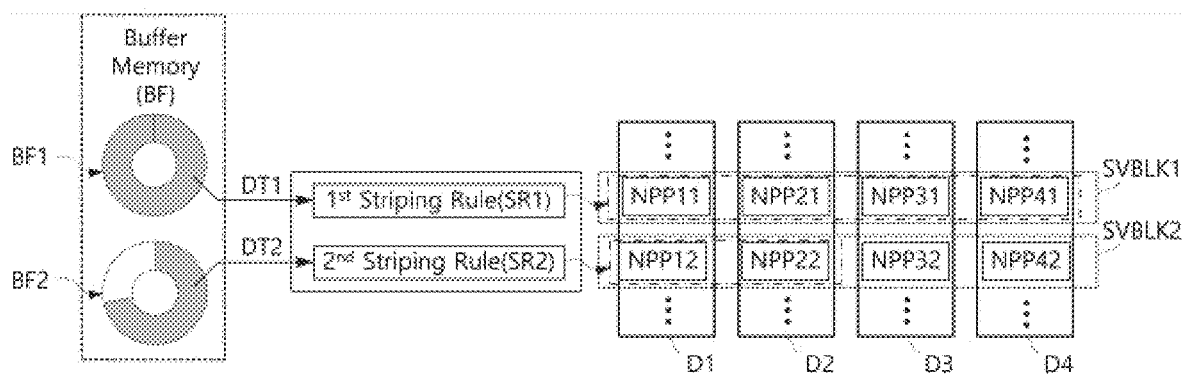
FIG. 8 is a diagram describing a method of changing a striping rule of a storage device according to some implementations of the present disclosure.

FIG. 8 is a diagram describing a method of changing a striping rule of a storage device according to some implementations of the present disclosure. FIG. 8 shows NAND program pages NPP11, NPP12, NPP21, NPP22, NPP31, NPP32, NPP41, and NPP42 included in the plurality of dies D1 to D4 of the nonvolatile memory device. In FIG. 8, a storage device according to some implementations may correspond to the storage device 20 of FIGS. 1 to 6. In FIG. 8, the plurality of dies D1 to D4 according to some implementations may correspond to some of the dies of the nonvolatile memory device 200 of FIGS. 1 to 6. According to some implementations, the size of the NAND program page NPP may be the same as or different from the size of the physical page PHY_PAGE of the nonvolatile memory device 200 described with reference to FIG. 3. The NAND program pages NPP11, NPP21, NPP31, and NPP41 may be connected to a first word line, and the remaining NAND program pages NPP12, NPP22, NPP32, and NPP42 may be connected to a second word line different from the first word line.

Referring to FIG. 8, the controller 100 may program first buffer data DT1, which are temporarily stored in a first buffer memory BF1 at a first point in time, at the NAND program pages NPP11, NPP21, NPP31, and NPP41 of blocks corresponding to the first super block SVBLK1 from among blocks included in the plurality of dies D1 to D4, based on the first striping rule SR1. At the first point in time, the first buffer memory BF1 may be in a state of being fully filled by the first buffer data DT1 or in a state of satisfying a given size condition of buffer data or a given ratio condition of buffer data. The first striping rule SR1 may refer to a striping rule in which buffer data are programmed in each of the plurality of dies D1 to D4 by interleaving. Accordingly, the controller 100 may program the first buffer data DT1 in the NAND program pages NPP11, NPP21, NPP31, and NPP41, respectively, by interleaving. In this case, because dies targeted for interleaving based on the first striping rule SR1 are the 4 dies D1 to D4, the number of interleaving units of the first buffer data DT1 determined by the first striping rule SR1 is 4.

When a given condition is satisfied, the controller 100 may change a striping rule being in use from the first striping rule SR1 to the second striping rule SR2. For example, the controller 100 may change the first striping rule SR1 to the second striping rule SR2 in response to the flush command provided from the host 10. Alternatively, when an error situation occurs in the storage device 20, the controller 100 may change the first striping rule SR1 to the second striping rule SR2.

When the given condition is satisfied after the striping rule being in use is changed to the second striping rule SR2, the controller 100 may program second buffer data DT2 based on the second striping rule SR2. The controller 100 may program the second buffer data DT2, which are temporarily stored in a second buffer memory BF2 at a second point in time, at blocks belonging to dies D1 and D2 among blocks of the second super block SVBLK2, based on the second striping rule SR2. The blocks of the second super block SVBLK2 may be in the plurality of dies D1 to D4. That is, the controller 100 may program the second buffer data DT2 at the NAND program pages NPP12 and NPP22 based on the second striping rule SR2. At the second point in time, the second buffer memory BF2 may be in a state of being partially filled by the second buffer data DT2. That is, the size of the second buffer data DT2 may be smaller than the size of the first buffer data DT1. The second striping rule SR2 may refer to a striping rule in which buffer data are programmed in some of the plurality of dies D1 to D4, by interleaving, based on a given criterion. For example, dies in which the second buffer data DT2 are programmed by the second striping rule SR2 may be D1 and D2. Accordingly, the controller 100 may program the second buffer data DT2 at the NAND program pages NPP12 and NPP22 of the dies D1 and D2, respectively, by interleaving. In this case, because dies targeted for interleaving based on the second striping rule SR2 are the 2 dies D1 and D2, the number of interleaving units of the second buffer data DT2 determined by the first striping rule SR2 is 2. The number of interleaving units determined by the second striping rule SR2 may be less than the number of interleaving units determined by the first striping rule SR1.

In some implementations, the number of interleaving units of the second buffer data DT2 determined by the second striping rule SR2 may be determined based on the size of the second buffer data DT2 and/or a ratio of the size of the second buffer data DT2 to the size of the second buffer memory BF2. For example, the second striping rule SR2 may refer to a striping rule in which the number of interleaving units is dynamically determined such that the write amplification factor WAF is reduced (e.g., minimized) when the second buffer data DT2 are programmed. Alternatively, the second striping rule SR2 may refer to a striping rule in which the number of interleaving units is dynamically determined by applying a weight between the reduction of the write amplification factor WAF and the improvement of read performance when the second buffer data DT2 are programmed. It is assumed that the improvement of read performance is implemented when buffer data are programmed in all the dies constituting the super block SVBLK by interleaving.

Accordingly, the second striping rule SR2 according to some implementations of FIG. 8 may reduce the write amplification factor WAF compared to the first striping rule SR1. This may mean that the second striping rule SR2 extends the lifetime of the storage device 20 and reduces a ratio by which a NAND I/O is occupied by temporary data. Also, because the second striping rule SR2 dynamically determines the number of interleaving units based on the size or ratio of buffer data, the second striping rule SR2 may efficiently reduce the write amplification factor WAF.

In some implementations, the controller 100 may record information of a word line to which the second striping rule SR2 is applied as separate information. For example, the controller 100 may record as separate information an address of a word line connected to the second super block SVBLK2 to which the second striping rule SR2 is applied.

When data are read from the word line connected to the second super block SVBLK2, the controller 100 may read data by using a read buffer memory of the changed size. For example, when data are read from a word line associated with the first striping rule SR1, the controller 100 may use the read buffer memory whose size corresponds to the NAND program pages NPP11, NPP21, NPP31, and NPP41. When data are read from a word line associated with the second striping rule SR2, the controller 100 may use the read buffer memory whose size is smaller than the size corresponding to the NAND program pages NPP11, NPP21, NPP31, and NPP41. For example, in the implementations described with reference to FIG. 8, the read buffer memory whose size corresponds to three NAND program pages may be used. When the separately stored information includes the number of applied interleaving units and a column address as well as the information of the word line to which the second striping rule SR2 is applied, the read buffer memory whose size corresponds to the number of applied interleaving units may be used.

Implementations of the present disclosure described with reference to FIG. 8 and to be described with reference to FIGS. 9 to 13 assume that each die of the nonvolatile memory device 200 includes one plane and an interleaving unit is determined based on a die. However, implementations of the present disclosure also contemplate that an interleaving unit is determined based on a plane, a block, etc. depending on a hardware or software configuration such as a channel, a way, and a multiplexer of the nonvolatile memory device 200.

Figure 9:
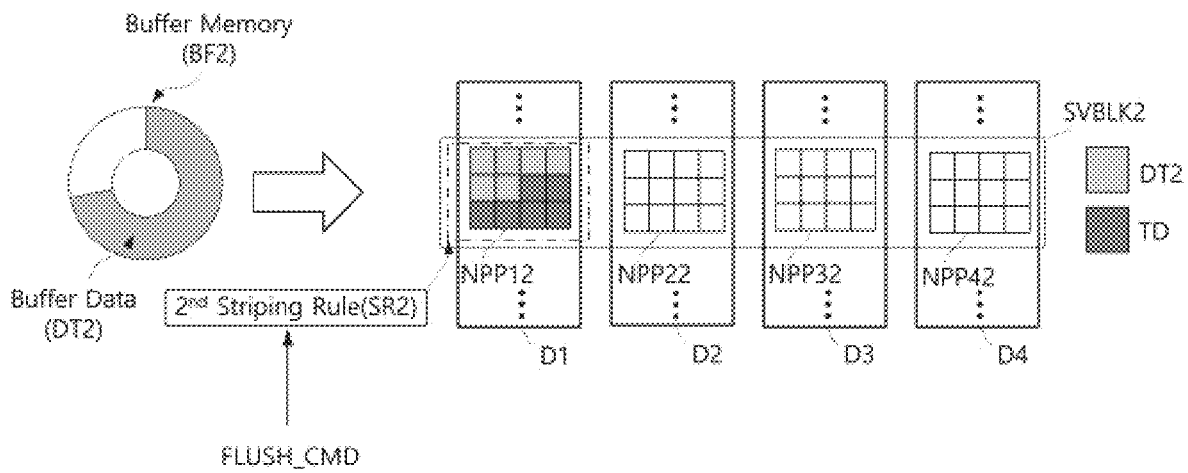
FIG. 9 is a diagram describing how to program buffer data according to some implementations of a striping rule of a storage device according to some implementations of the present disclosure.

FIG. 9 is a diagram describing how to program buffer data according to some implementations of a striping rule of a storage device according to some implementations of the present disclosure. FIG. 9 shows the NAND program pages NPP12, NPP22, NPP32, and NPP42 respectively included in the plurality of dies D1 to D4 of the nonvolatile memory device. In FIG. 9, a storage device according to some implementations may correspond to the storage device 20 of FIGS. 1 to 6. In FIG. 9, the plurality of dies D1 to D4 according to some implementations may correspond to some of the dies of the nonvolatile memory device 200 of FIGS. 1 to 6. In some implementations described with reference to FIG. 9, the second buffer memory BF2 may correspond to the second buffer memory BF2 at the second point in time in the implementations described with reference to FIG. 8.

In FIG. 9, the storage device 20 may program the second buffer data DT2 at at least some of the plurality of dies D1 to D4 based on the second striping rule SR2 changed in response to a flush command FLUSH_CMD received from the host 10.

Some implementations of the present disclosure will be described with reference to FIG. 9 under the assumption that the second striping rule SR2 refers to a striping rule of reducing the write amplification factor WAF and the second buffer data DT2 are buffer data whose size corresponds to 6 logical page numbers LPN. That is, some implementations of the present disclosure will be described with reference to FIG. 9 by using a situation where the size of buffer data is the same as that of the conventional example described with reference to FIG. 7.

To program the second buffer data DT2, the controller 100 may determine the number of interleaving units based on the write amplification factor WAF in the dies D1 and D2 grouped as the second super block SVBLK2. Alternatively, the number of interleaving units may be determined by comparing the size of the second buffer data DT2 and the size of the NAND program pages NPP12, NPP22, NPP32, and NPP42 grouped as the second super block SVBLK2. For example, because the second buffer data DT2 correspond to 6 logical page numbers LPN, the entire second buffer data DT2 may be programmed at one NAND program page having TLCs. Accordingly, the controller 100 may determine the number of interleaving units as 1, based on the second striping rule SR2. Accordingly, the second buffer data DT2 and the temporary data TD may be programmed only in the die D1. Accordingly, the write amplification factor WAF according to the implementations of the present disclosure described with reference to FIG. 9 may be 2 (=12/6), which is smaller than 8 as the write amplification factor WAF of the case described with reference to FIG. 7.

That is, the striping rule of reducing the write amplification factor WAF may determine the number of interleaving units as a minimum integer "k" satisfying a condition in which a storage space corresponding to the number of interleaving units, denoted as "k," is larger than or equal to the size of buffer data. The integer "k" is an integer less than or equal to the number of blocks constituting a super block. For example, unlike the example illustrated in FIG. 9, when the second buffer data DT2 correspond to 15 logical page numbers LPN, the number of interleaving units may be determined based on the second striping rule SR2 as "2," and the second buffer data DT2 and the temporary data TD may be programmed in the die D1 and the die D2.

Unlike the conventional storage device described with reference to FIG. 7, in the implementations of the present disclosure described with reference to FIG. 9, a physical address may be allocated to the second buffer data DT2 which are programmed based on the second striping rule SR2 when the second buffer data DT2 are actually programmed in the nonvolatile memory device 200. That is, because the NAND program page NPP where the second buffer data DT2 are to be programmed is dynamically determined, a physical address may be allocated to the second buffer data DT2 when the second buffer data DT2 are actually programmed in the nonvolatile memory device 200. In other implementations, the controller 100 may allocate a physical address when the second buffer data DT2 are stored in the second buffer memory BF2, may release the allocated physical address based on the number of interleaving units dynamically determined when the second buffer data DT2 are actually programmed in the nonvolatile memory device 200, and may reallocate a new physical address.

FIGS. 10, 11A, 11B, and 11C describe implementations in which the controller 100 programs third buffer data DT3 in the nonvolatile memory device 200 after the second buffer data DT2 are programmed based on the second striping rule SR2 changed according to the implementations of FIG. 9.

In some implementations, the controller 100 may change a striping rule being in use in response to that a given condition is satisfied (e.g., in response to that the flush command FLUSH_CMD is received from the host 10), may program buffer data based on the changed striping rule, and may then change the size of a buffer memory.

Figure 10:
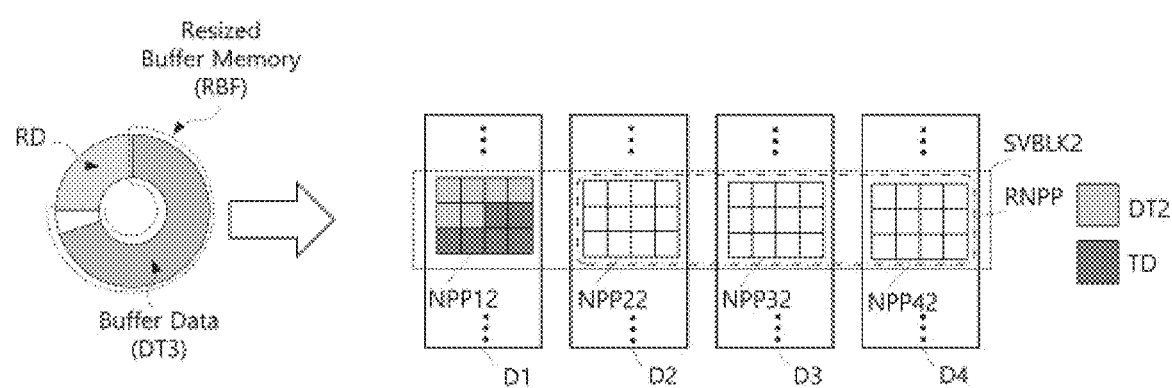
FIG. 10 is a diagram describing some implementations in which a size of a buffer memory is changed after buffer data are programmed depending on a striping rule changed according to some implementations of FIG. 8.

Referring to FIG. 10, the controller 100 may program the second buffer data DT2 at the NAND program page NPP12 based on the second striping rule SR2 changed in the implementations described with reference to FIG. 8 and may then decrease the size of the buffer memory. For example, after the controller 100 programs the second buffer data DT2 based on the second striping rule SR2 thus changed, the controller 100 may change the size of the buffer memory to be appropriate for the size of residual NAND program pages RNPP being the remaining NAND program pages NPP22, NPP32, and NPP42 connected to the same word line.

The size of a resized buffer memory RBF may be based on the number of interleaving units determined based on the second striping rule SR2. For example, in the implementations of FIG. 9, because one of the dies D1 to D4 corresponding to the second super block SVBLK2 is determined as an interleaving unit, the size of the resized buffer memory RBF may be smaller than the previous size of the buffer memory as much as 25%.

When a given condition is satisfied, the controller 100 may program the third buffer data DT3 temporarily stored in the resized buffer memory RBF in the nonvolatile memory device 200. For example, the third buffer data DT3 may fully fill the resized buffer memory RBF or may fill the resized buffer memory RBF as much as a given ratio or more. This will be described with reference to FIGS. 11A and 11B.

In some implementations, the controller 100 may program the third buffer data DT3 at the residual NAND program pages RNPP being the remaining NAND program pages NPP22, NPP32, and NPP42 other than the NAND program page NPP12 where the second buffer data DT2 are programmed. According to some implementations, temporary data may be partially stored together with the third buffer data DT3.

Figure 11A:
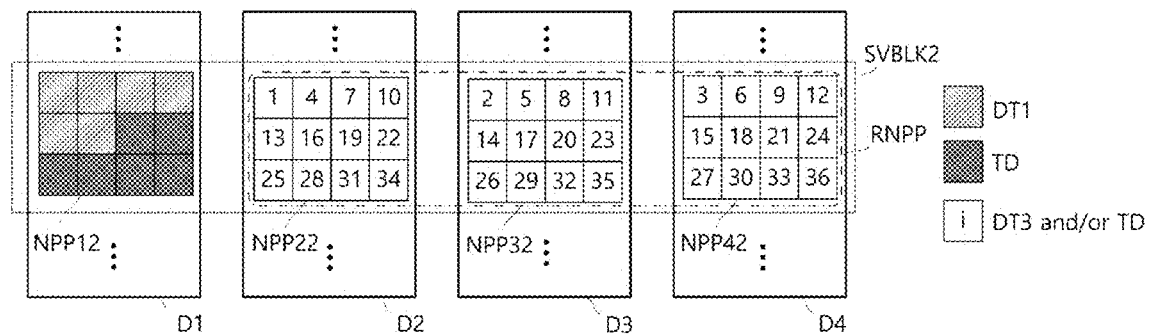
FIGS. 11A to 11C are diagrams describing some implementations in which programming for residual NAND program pages is performed after buffer data are programmed depending on a striping rule changed according to some implementations of FIG. 8.
Figure 11B:
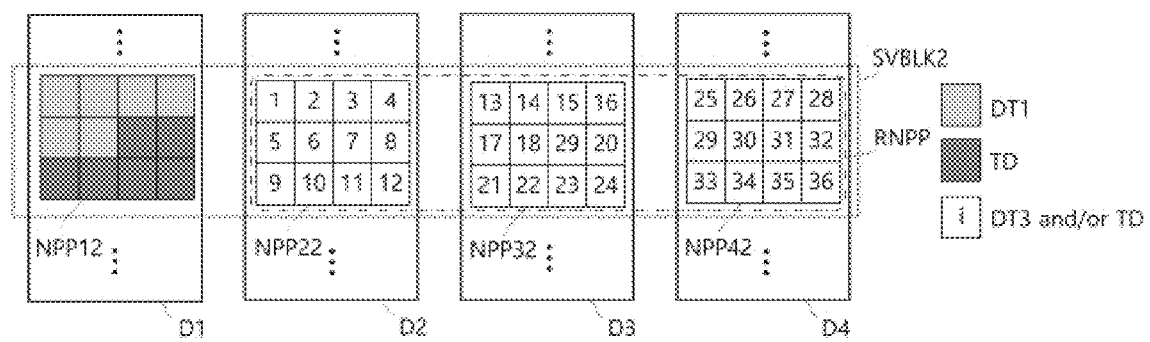
Figure 11C:
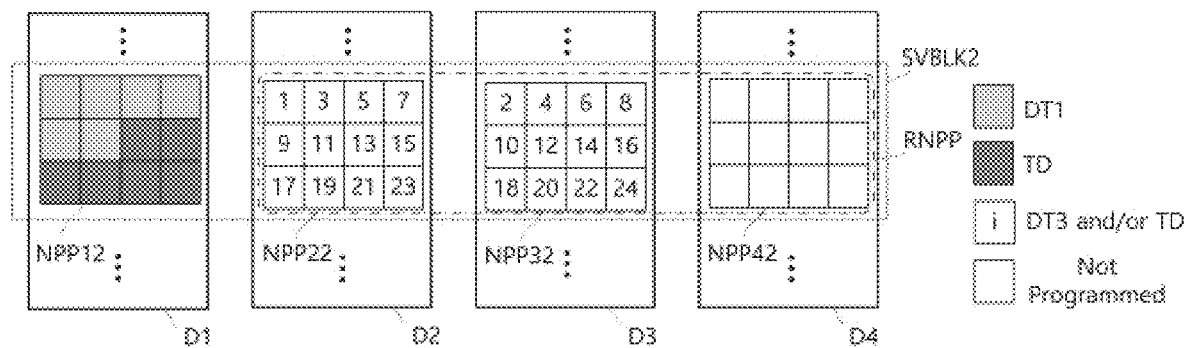

FIGS. 11A to 11C show implementations in which the controller 100 programs the third buffer data DT3 at the residual NAND program pages RNPP. The third buffer data DT3 may be user data transmitted from the host 10 together with at least one write command after the second buffer data DT2 are programmed.

Referring to FIG. 11A, in some implementations, the controller 100 may program the third buffer data DT3 at the residual NAND program pages RNPP by interleaving. When the size of the third buffer data DT3 is smaller than the size of the storage space of the residual NAND program pages RNPP, the temperature data TD may be programmed together with the third buffer data DT3. Accordingly, the third buffer data DT3 and the temporary data TD may be programmed in the round robin manner for each of the NAND program pages NPP22, NPP32, and NPP42. A label of each of square boxes of FIGS. 11A and 11B means an order in which data are programmed at the NAND program pages NPP22, NPP32, and NPP42.

Referring to FIG. 11B, in other implementations, the controller 100 may sequentially program the third buffer data DT3 at the residual NAND program pages RNPP. When the size of the third buffer data DT3 is smaller than the size of the storage space of the residual NAND program pages RNPP, the temperature data TD may be programmed together with the third buffer data DT3. Accordingly, after the third buffer data DT3 and the temporary data TD are completely programmed at the NAND program page NPP22, the third buffer data DT3 and the temporary data TD may be programmed at each of the NAND program page NPP32 and the NAND program page NPP42 in order.

The implementations described with reference to FIGS. 11A and 11B are associated with some implementations in which read performance is considered when data are programmed at the residual NAND program pages RNPP after the second striping rule SR2 is applied or some implementations in which programming overhead is considered when data are programmed at the residual NAND program pages RNPP after the second striping rule SR2 is applied.

Referring to FIG. 11C, in other implementations, the controller 100 may program the third buffer data DT3 at the residual NAND program pages RNPP based on the same second striping rule SR2. For example, the flush command may be again received from the host 10 while the third buffer data DT3 are stored in the buffer memory. In this case, the controller 100 may determine the number of interleaving units, in which the third buffer data DT3 are to be programmed, based on the second striping rule SR2 described with reference to FIG. 10. Referring to FIG. 11C, the controller 100 may determine the number of interleaving units for programming the third buffer data DT3 as 2, based on the second striping rule SR2. The controller 100 may program the third buffer data DT3 at the NAND program pages NPP22 and NPP32 corresponding to two interleaving units. That is, in this case, the third buffer data DT3 may not be programmed at the NAND program page NPP42 among the residual NAND program pages RNPP. Afterwards, the NAND program page NPP42 may again constitute the residual NAND program page RNPP; according to some implementations, buffer data may be programmed at the NAND program page NPP42 depending on one of the implementations of FIGS. 11A to 11C.

Figure 12A:
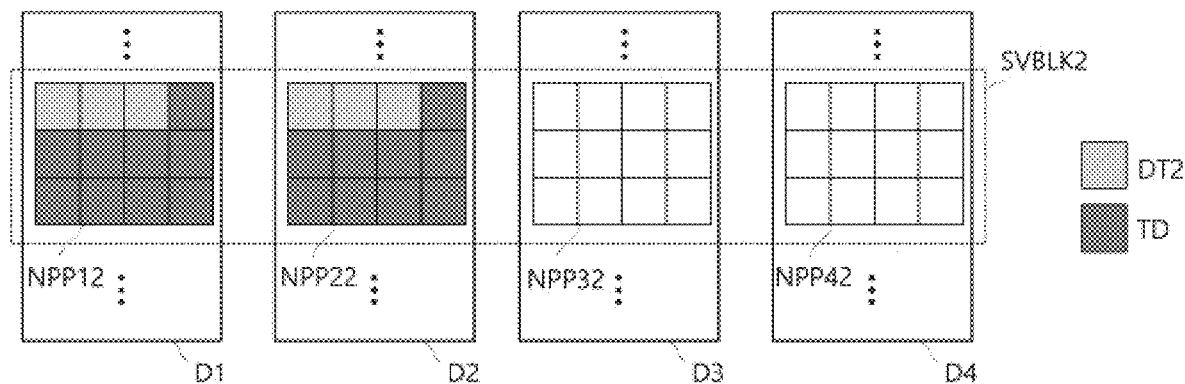
FIGS. 12A to 12C are diagrams describing programming of buffer data according to some implementations of a striping rule.
Figure 12B:
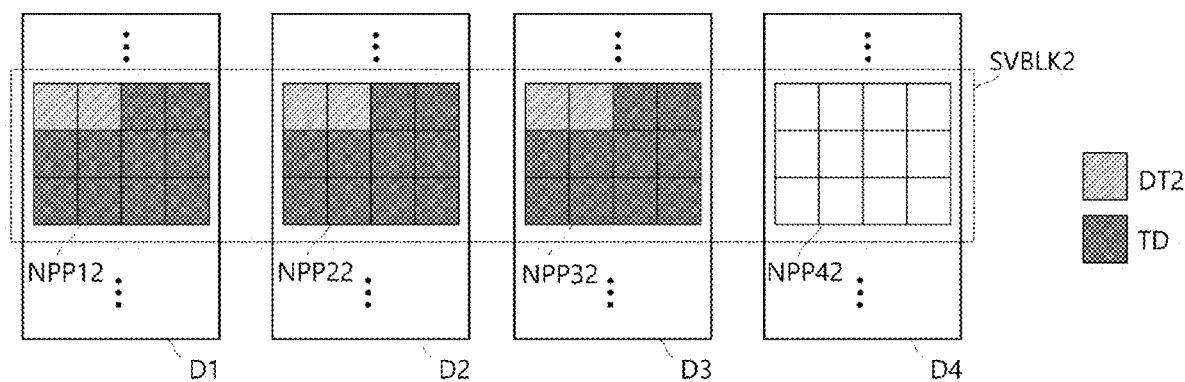
Figure 12C:
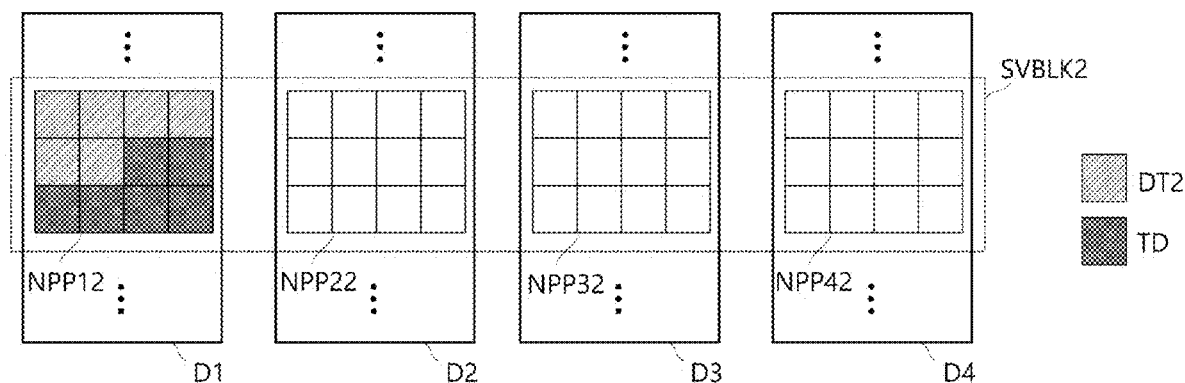

Implementations to be described with reference to FIGS. 12A to 12C show results obtained by applying implementations of the second striping rule SR2 to the implementations described with reference to FIG. 8. The write amplification factors WAF according to the implementations of FIGS. 12A to 12C are 6 (=36/6), 4 (=24/6), and 2 (=12/6), respectively.

FIGS. 12A to 12C show the NAND program pages NPP12, NPP22, NPP32, and NPP42 respectively included in the plurality of dies D1 to D4 of the nonvolatile memory device. A storage device according to the implementations of FIGS. 12A to 12C may correspond to the storage device 20 of FIGS. 1 to 6 and 8 to 11. The plurality of dies D1 to D4 according to the implementations of FIGS. 12A to 12C may correspond to a portion of the nonvolatile memory device 200 of FIGS. 1 to 6 and 8 to 11. The implementations described with reference to FIGS. 12A to 12C assume a situation in which the controller 100 programs the second buffer data DT2 corresponding to 6 logical page numbers LPN based on the second striping rule SR2.

FIG. 12C shows a result in which the second buffer data DT2 are programmed in one interleaving unit determined according to the implementations of the second striping rule SR2 reducing the write amplification factor WAF described with reference to FIG. 9.

FIGS. 12A and 12B show results of performing programming based on implementations in which the second striping rule SR2 considers both the write amplification factor WAF and expected performance of the read operation for the programmed second buffer data DT2.

That is, the second striping rule SR2 according to the implementations of FIGS. 12A and 12B may determine the number of interleaving units to be more than the number of interleaving units determined such that the write amplification factor WAF is reduced and to be less than the number of interleaving units determined based on the first striping rule SR1 in which interleaving is made over all the dies constituting the super block SVBLK.

In some implementations, the second striping rule SR2 according to the implementations of FIGS. 12A and 12B may be a policy of determining the number of interleaving units by applying a weighting factor to the number of interleaving units determined such that the write amplification factor WAF is reduced. The weighting factor may be experimentally determined based on various types of requests, various types of user data, various sizes of user data, etc. The weighting factor may be determined such that the number of interleaving units determined by the second striping rule SR2 is less than the number of interleaving units determined by the first striping rule SR1 (i.e., is less than the number of interleaving units by which data are programmed at all the NAND program pages constituting a super block by interleaving).

Figure 13:
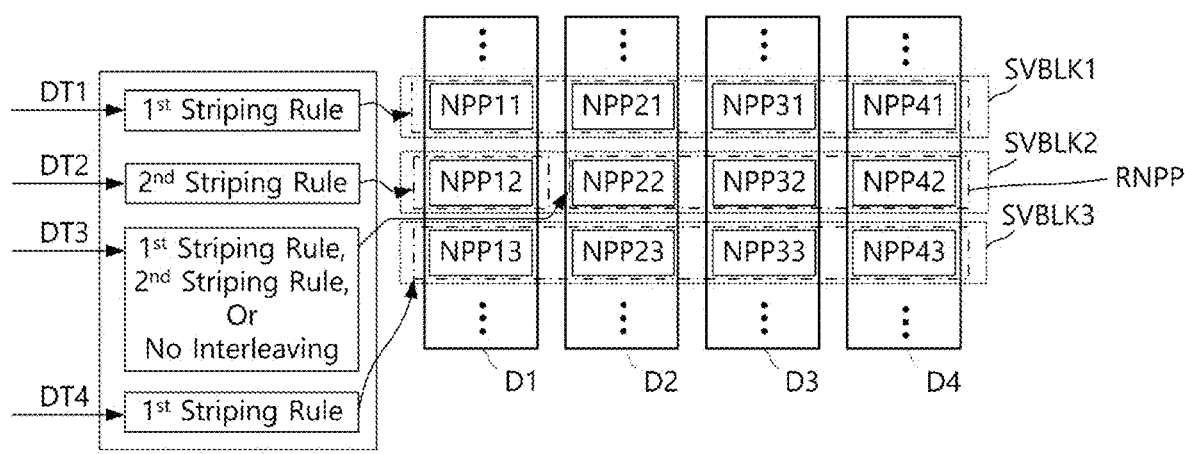
FIG. 13 is a diagram describing some implementations in which a striping rule is again changed based on a change of a word line after a storage device according to some implementations of the present disclosure changes a striping rule.

FIG. 13 is a diagram describing some implementations in which a striping rule is again changed based on a change of a word line after a storage device according to some implementations of the present disclosure changes a striping rule. The storage device 20 of FIG. 13 may correspond to the storage device 20 of FIGS. 1 to 6 and 8 to 12C. Implementations of the present disclosure illustrated in FIG. 13 will be described with reference to FIGS. 8 to 13.

FIG. 13 shows three super blocks SVBLK1, SVBLK2, and SVBLK3. The super blocks SVBLK1, SVBLK2, and SVBLK3 may be respectively connected to different word lines. The first super block SVBLK1 may be connected to a first word line, the second super block SVBLK2 may be connected to a second word line, and the third super block SVBLK3 may be connected to the third word line. As in the first super block SVBLK1 of FIG. 8, the first buffer data DT1 may be programmed at the first super block SVBLK1 based on the first striping rule SR1. The second buffer data DT2 may be programmed at the NAND program page NPP12 of the second super block SVBLK2 based on the second striping rule SR2 of FIGS. 9 to 12C. The third buffer data DT3 may be programmed at the residual NAND program page RNPP of the second super block SVBLK2 based on the implementations of FIGS. 11A to 11C. The third buffer data DT3 may be programmed at all the residual NAND program pages RNPP based on the first striping rule SR1, may be sequentially programmed at each of the residual NAND program pages RNPP without interleaving, or may be programmed at the residual NAND program page RNPP again based on the second striping rule SR2 when a given condition is satisfied.

After the programming of the second buffer data DT2 based on the changed second striping rule SR2 and the programming of the third buffer data DT3 at the residual NAND program page RNPP are completed, the controller 100 may again change the size of the resized buffer memory RBF according to the implementations described with reference to FIG. 10 to an original size and may again change the changed striping rule to an original striping rule. That is, the controller 100 may again change the second striping rule SR2 to the first striping rule SR1.

The controller 100 may program fourth buffer data DT4, which are stored in the buffer memory whose size is recovered to the original size based on the first striping rule SR1, at the changed word line, that is, at the third super block SVBLK3.

That is, when a word line (or a super block) to which a striping rule changed depending on a given condition (e.g., the flush command received from the host 10) is applied is changed, the controller 100 of the storage device 20 according to the implementations of FIG. 13 may again change the changed striping rule to an original striping rule. Accordingly, the striping rule of decreasing the write amplification factor WAF may be applied in the case of programming buffer data, whose size is smaller than the size of the buffer memory, in response to the flush command of the host 10, an error situation of the storage device 20, etc., and the striping rule of decreasing I/O performance such as read performance may be applied in any other cases. Accordingly, the performance and lifetime of the storage device 20 may be improved by dynamically applying the striping rule to be appropriate for various situations.

Referring to FIG. 13, in the first super block SVBLK1 connected to the first word line, the NAND program pages NPP11, Npp21, NPP31, and NPP41 programmed based on the first striping rule SR1 may be referred to as a "first interleaving unit." In the second super block SVBLK2 connected to the second word line, the NAND program page NPP12 programmed based on the changed second striping rule SR2 may be referred to as a "second interleaving unit." That is, the first interleaving unit may be determined by the first striping rule SR1, and the second interleaving unit may be determined by the second striping rule SR2. Accordingly, the number of second interleaving units determined by the second striping rule SR2 may be less than the number of first interleaving units determined by the first striping rule SR1. The first interleaving unit and the second interleaving unit may be respectively connected to different word lines adjacent to each other and may be adjacent to each other along a direction perpendicular to a word line.

In the second super block SVBLK2 connected to the second word line, the residual NAND program pages NPP22, NPP32, and NPP42 may be programmed again based on the first striping rule SR1 or based on the changed second striping rule SR2; in this case, an interleaved NAND program page may be referred to as a "third interleaving unit." Accordingly, when the third interleaving unit is determined by the second striping rule SR2, the number of third interleaving units may be less than the number of first interleaving units determined by the first striping rule SR1. The first interleaving unit and the third interleaving unit may be respectively connected to different word lines adjacent to each other and may be adjacent to each other along a direction perpendicular to a word line. Also, when the third interleaving unit is determined by the first striping rule SR1, the second interleaving unit and the third interleaving unit may be connected to the same word line as the second interleaving unit determined by the second striping rule SR2 and may be adjacent to each other in a direction parallel to a word line.

FIG. 14 is a diagram describing an operating method of a storage device according to some implementations of the present disclosure. A storage device of some implementations to be described with reference to FIG. 14 may correspond to the storage device 20 of FIGS. 1 to 6 and 8 to 13.

The storage device 20 may temporarily store user data, which are transmitted from the host 10 together with at least one write command, in a buffer memory as first buffer data.

When the size of the first buffer data exceeds a given ratio of the buffer memory, when the size of the first buffer data exceeds a given criterion, and/or when the buffer memory is fully filled by the first buffer data, in operation S110, the storage device 20 may program the first buffer data in the nonvolatile memory device 200 based on a first striping rule. The first striping rule may refer to a striping rule in which buffer data are programmed at each of a plurality of interleaving units included in a super block in the round robin manner, so as to be interleaved.

Afterwards, the storage device 20 may temporarily store user data, which are again transmitted from the host 10 together with at least one write command, in the buffer memory as second buffer data.

In operation S120, the storage device 20 may receive the flush command from the host 10.

In operation S130, the storage device 20 may change the first striping rule being in use to a second striping rule in response to the flush command.

In some implementations, the second striping rule may refer to a striping rule in which buffer data are programmed such that the write amplification factor WAF is reduced. In other implementations, the second striping rule may refer to a striping rule in which programming is performed in consideration of expected performance of the read operation for buffer data as well as the write amplification factor WAF. For example, the second striping rule may refer to a policy of determining the number of interleaving units by applying a weighting factor to the number of interleaving units, which is determined such that the write amplification factor WAF is reduced. The weighting factor may be experimentally determined based on various types of requests, various types of user data, various sizes of user data, etc. The number of interleaving units determined by the second striping rule may be less than the number of interleaving units determined by the first striping (i.e., is less than the number of interleaving units by which data are programmed at all the NAND program pages constituting a super block by interleaving).

In operation S150, the storage device 20 may dynamically determine the number of interleaving units for programming the second buffer data, based on the changed second striping rule. The storage device 20 may program the second buffer data at at least one interleaving unit determined based on the second interleaving unit.

A storage device according to the present disclosure may decrease a write amplification factor, and thus, the lifetime of the storage device may be improved.

The storage device according to the present disclosure may decrease a write amplification factor without significant reduction (or loss) of I/O performance by changing a striping rule based on a command of a host.

The storage device according to the present disclosure may decrease a write amplification factor without significant reduction (or loss) of I/O performance by changing a striping rule based on the size of buffer data when the buffer data are programmed in a nonvolatile memory device.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination While the present disclosure has been described with reference to implementations thereof, it will be apparent to those of ordinary skill in the art that various changes and modifications may be made thereto without departing from the spirit and scope of the present disclosure as set forth in the following claims.

What is claimed is:

1. A storage device comprising:
   at least one nonvolatile memory device configured to store or read data; and
   a controller configured to control the nonvolatile memory device and to perform a request received from a host,
   wherein the controller is configured to program buffer data stored in a buffer in the at least one nonvolatile memory device based on one of a plurality of striping rules associated with the at least one nonvolatile memory device,
   wherein the controller is configured to change a first striping rule to a second striping rule in response to a predetermined condition being satisfied, and is configured to program first buffer data in the at least one nonvolatile memory device based on the second striping rule, and
   wherein a write amplification factor of the first striping rule and a write amplification factor of the second striping rule are different from each other.

2. The storage device of claim 1, wherein, the controller is configured to, in response to a flush command being received from the host, program the first buffer data in the at least one nonvolatile memory device based on the second striping rule.

3. The storage device of claim 2, wherein the controller is configured to allocate a physical address of the nonvolatile memory device to the first buffer data in response to the flush command, and wherein the first buffer data are to be stored at the physical address.

4. The storage device of claim 1, wherein the controller is configured to determine a number of interleaving units based on a write amplification factor, wherein the first buffer data are interleaved in the interleaving units based on the second striping rule.

5. The storage device of claim 4, wherein the second striping rule includes a rule in which a size of a temporary data storage space of the nonvolatile memory device is reduced, wherein temporary data are programmed together with the first buffer data in the temporary data storage space.

6. The storage device of claim 4, wherein the second striping rule includes a striping rule in which a size of a temporary data storage space of the nonvolatile memory device is reduced, wherein temporary data are programmed together with the first buffer data in the temporary data storage space, and the rule includes expected performance of a read operation for the first buffer data completely programmed in the nonvolatile memory device.

7. The storage device of claim 4, wherein a number of the interleaving units determined based on the second striping rule is more than a number of interleaving units determined such that the size of the temporary data storage space is reduced,
   wherein the number of the interleaving units determined based on the second striping rule is less than a number of interleaving units determined based on the first striping rule, and
   wherein the temporary data are programmed in the nonvolatile memory device together with the first buffer data.

8. The storage device of claim 1, wherein the controller is configured to dynamically determine, based on a size of the first buffer data, a number of interleaving units in which the first buffer data are interleaved based on the second striping rule.

9. The storage device of claim 2, wherein the controller is configured to change the second striping rule to the first striping rule in response to the flush command being executed.

10. The storage device of claim 1,
    wherein the controller is configured to program, based on the second striping rule, the first buffer data in a first storage space among at least some of storage spaces corresponding to a first word line, and
    wherein the controller is configured to program, based on the second striping rule, second buffer data in a residual second storage space among the storage spaces corresponding to the first word line other than the first storage space, the second buffer being associated with a first write command provided from the host.

11. The storage device of claim 10, wherein the controller is configured to program, based on the first striping rule, third buffer data in storage spaces corresponding to a second word line different from the first word line, the third buffer data being associated with a second write command provided from the host.

12. The storage device of claim 2, wherein the controller is configured to change a size of the buffer in response to the flush command being executed.

13. The storage device of claim 1, wherein, the controller is configured to, in response to a predetermined internal error occurring, program the first buffer data in the at least one nonvolatile memory device based on the second striping rule.

14. An operating method of a storage device, the method comprising:
   programming, at a controller and based on a first striping rule, first buffer data stored in a buffer in a nonvolatile memory device;
   receiving, at the controller, a flush command from a host;
   changing, at the controller, the first striping rule to a second striping rule in response to the flush command; and
   programming, at the controller and based on the second striping rule, second buffer data stored in the buffer in the nonvolatile memory device.

15. The method of claim 14, further comprising:
   determining the number of interleaving units for programming the second buffer data by interleaving such that a size of a temporary data storage space is reduced,
   wherein the temporary data storage space is a space of the nonvolatile memory device, wherein the temporary data storage space is configured to store the temporary data to be programmed in the nonvolatile memory device together with the second buffer data.

16. The method of claim 15, further comprising:
   programming, at the controller, third buffer data in a residual second storage space other than a first storage space,
   wherein the residual second storage space is among storage spaces corresponding to a word line,
   wherein the second buffer data are programmed in the storage spaces,
   wherein the third buffer data are programmed based on the first striping rule or without interleaving.

17. The method of claim 14, further comprising:
   monitoring a change of a total amount of buffer data stored in the buffer; and
   in response to that the total amount of buffer data satisfies a predetermined condition, programming, at the controller and based on the first striping rule, fourth buffer data stored in the buffer in the nonvolatile memory device
   wherein the fourth buffer data are programmed at a word line different from a word line where the second buffer data are programmed.

18. A storage device comprising:
   at least one nonvolatile memory device configured to store or read data; and
   a controller configured to control the nonvolatile memory device and to execute a command provided from a host,
   wherein the controller is configured to program, by interleaving, buffer data at at least one interleaving unit determined based on one of a plurality of striping rules associated with the at least one nonvolatile memory device,
   wherein the nonvolatile memory device includes a first word line and a second word line adjacent to each other,
   wherein a number of at least one first interleaving unit of the first word line is different from a number of at least one second interleaving unit of the second word line,
   wherein the at least one first interleaving unit and the at least one second interleaving unit are adjacent to each other along a direction perpendicular to at least one of the first word line and the second word line, and
   wherein the buffer data are recorded at the at least one first interleaving unit and the at least one second interleaving unit based on different striping rules among the plurality of striping rules.

19. The storage device of claim 18, wherein at least one third interleaving unit of the first word line and the at least one first interleaving unit are adjacent to each other along a direction parallel to the word line, and
   wherein the buffer data are recorded at the at least one first interleaving unit and the at least one third interleaving unit based on different striping rules among the plurality of striping rules.

* * * * *